United States Patent [19]

Beiley et al.

[11] Patent Number: 4,844,517
[45] Date of Patent: Jul. 4, 1989

[54] TUBE COUPLING

[75] Inventors: Mark J. Beiley, Harbor; Makram T. Mikhail, Temple; Patrick J. Callanan, Northridge, all of Calif.

[73] Assignee: Sierracin Corporation, Burbank, Calif.

[21] Appl. No.: 57,319

[22] Filed: Jun. 2, 1987

[51] Int. Cl.⁴ .............................................. F16L 13/14
[52] U.S. Cl. .................. 285/382.4; 285/110; 285/342; 285/422
[58] Field of Search ............... 285/382.4, 382.5, 382.7, 285/258, 259, 422, 342

[56] References Cited

U.S. PATENT DOCUMENTS

| | | | |
|---|---|---|---|
| 2,709,092 | 5/1955 | Wallace | 285/382.5 X |
| 3,484,123 | 12/1969 | van der Velden | 285/382.5 X |
| 3,711,132 | 1/1973 | Nickerson | 285/382.4 |
| 3,730,567 | 5/1973 | Webster | 285/382.4 |
| 3,817,562 | 6/1974 | Cook et al. | 285/382.5 X |
| 3,827,727 | 8/1974 | Moebius | 285/382.2 X |
| 3,893,720 | 7/1975 | Moebius | 285/382.2 X |
| 4,026,006 | 5/1977 | Moebius | 29/508 |
| 4,061,367 | 12/1977 | Moebius | 285/382.2 |
| 4,147,385 | 4/1979 | van der Velden | 285/382.4 |
| 4,189,817 | 2/1980 | Moebius | 29/237 |
| 4,289,340 | 9/1981 | Press et al. | 285/382.4 |
| 4,688,318 | 8/1987 | Foucault et al. | 285/382.5 X |

FOREIGN PATENT DOCUMENTS 1121851 7/1968 United Kingdom ............ 285/382.4

OTHER PUBLICATIONS

Pamphlet entitled "Resistoflex Corporation DY-12," Installation Instructions, for Dynatube Fitting (Unkown Date).

Primary Examiner—Thomas F. Callaghan
Attorney, Agent, or Firm—Sheldon & Mak

[57] ABSTRACT

A coupling for swaged attachment to thin wall tubing. The coupling is a cylindrical body with a longitudinal axis and an inner peripheral wall. At least one groove is located in the inner peripheral wall. In one embodiment, the groove is substantially rectangular in cross section. The rectangular groove has a base and two side walls. The side walls meet the base to form corners. The corners have a radius of curvature of at least the depth of the groove. Alternatively, the cross section of the groove can be ramped in shape. The ramped shape groove has a base and two side walls. One of the two side walls meets the base at about 90°, and the second side wall meets the base at an angle substantially greater than 90°. In a third embodiment of the invention, the groove is ramped with one side wall meeting the inner peripheral wall of the coupling sleeve at about 90°, and a second side wall meeting the inner peripheral sleeve of the inner peripheral wall of the coupling sleeve at substantially less than 90°. The preferred material for the coupling sleeve for aerospace use is titanium.

22 Claims, 2 Drawing Sheets

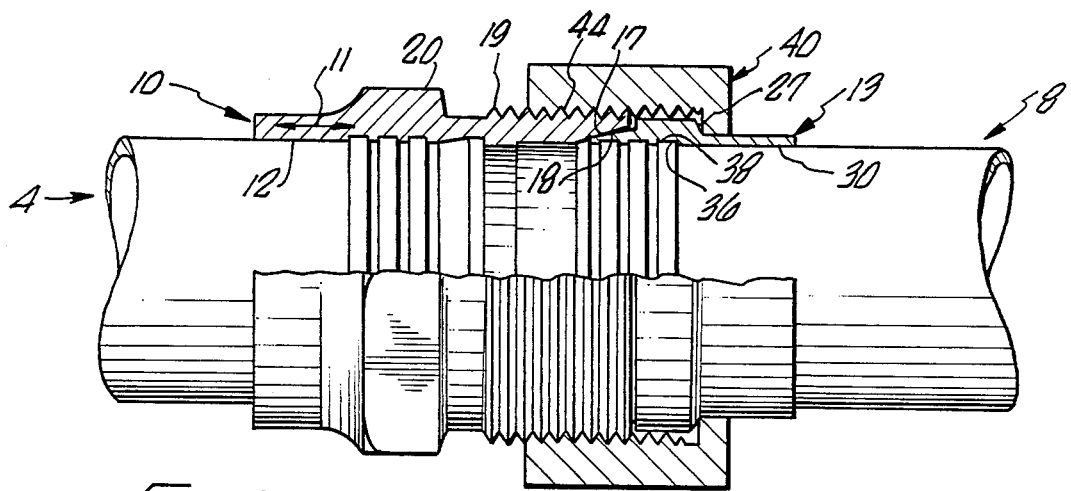
FIG_1
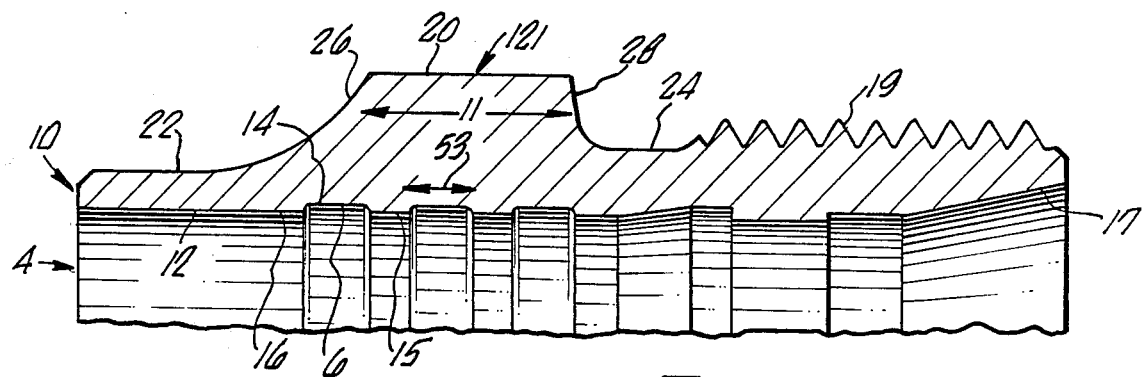
FIG_2
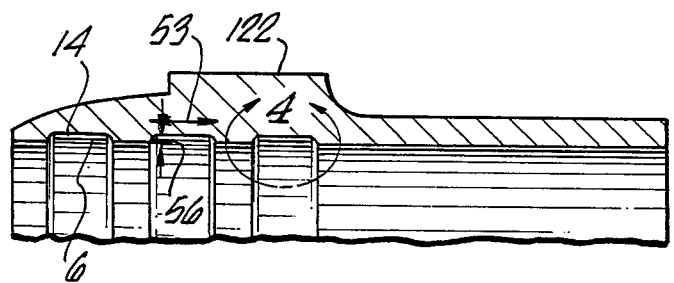
FIG_3
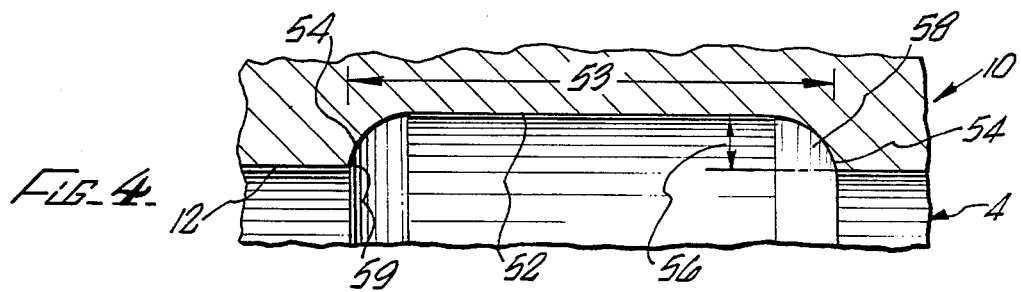
FIG_4

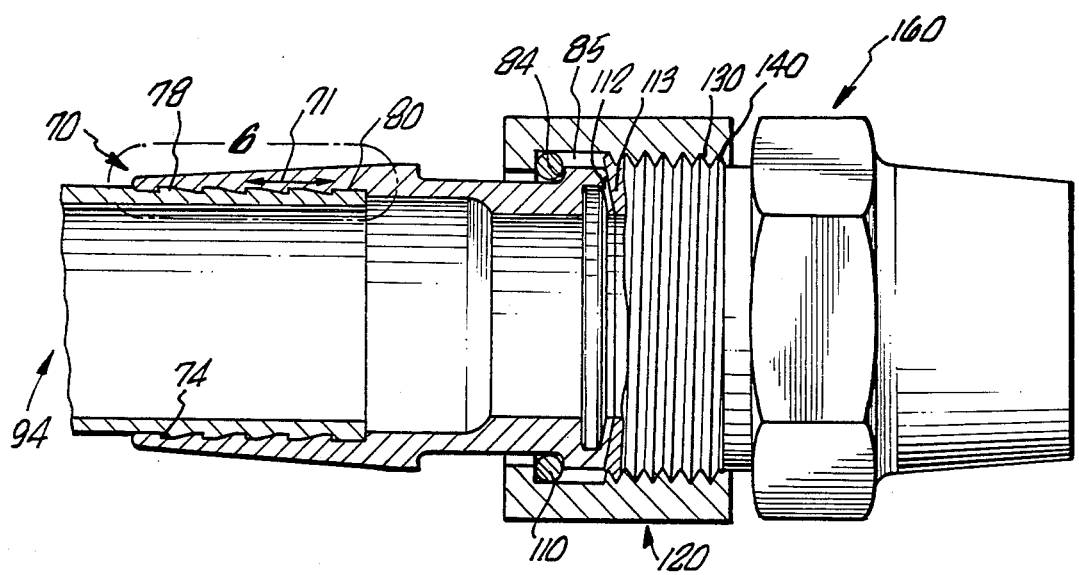
FIG_5
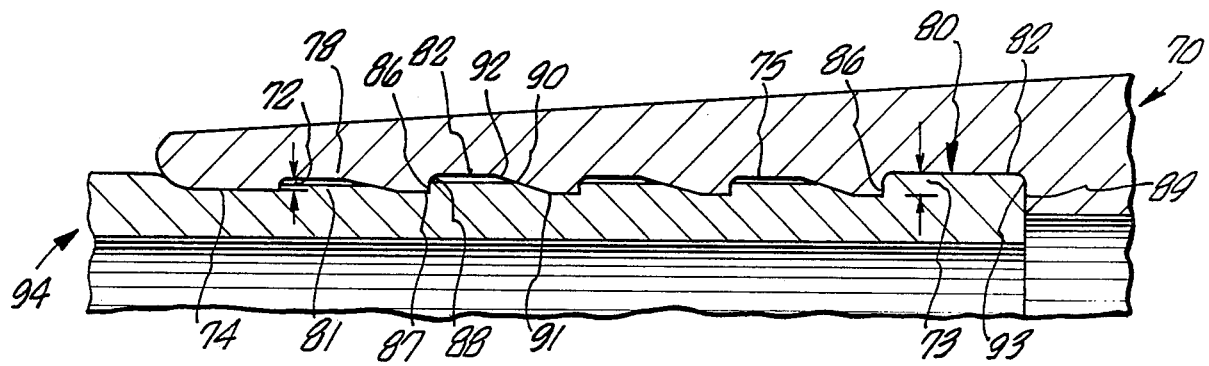
FIG_6

TUBE COUPLING

BACKGROUND

The present invention relates to a coupling for rigid attachment to metallic tubing. In particular the invention relates to a coupling having an interior configuration such that it can be swaged to such tubing in a pressure tight relationship while satisfying all mechanical and performance requirements for such swaged joints.

In many applications of hydraulic systems such as used in aircraft and aerospace applications, the end fittings for the tubing in such systems are flareless fittings with swaged on couplings or sleeves. Such sleeves have been characterized by internal annular grooves and were developed for use with light weight, thin wall, hydraulic tubing to eliminate the leakage and inadequate tensile joint strength problems encountered with bite type sleeves.

Among the couplings currently in use is a sleeve whose internal annular grooves are rectangular in shape, such as those described in U.S. Pat. No. 4,147,385, to Van der Velden, assignor to Boeing. The disclosures therein are incorporated by reference herein. In the sleeve described in U.S. Pat. No. 4,147,385, each groove has a base and two side walls, each side wall meeting the base at about 90° to form corners; each corner having a small radius of curvature.

Another type of coupling currently in use has internal ramped grooves, such as those described in U.S. Pat. No. 4,026,006 to Mobius, which is incorporated by reference herein. In the sleeve described in U.S. Pat. No. 4,026,006, one wall of the groove meets the base at an angle greater than 90°, and a second wall meets the base at an angle of about 90°.

Currently used couplings with rectangular grooves are less than optimal for a number of reasons. Because of the small radius of curvature at the corners of the grooves where the sidewalls meet the base, tubing being swaged into the rectangular grooves tends to develop cracks. This is especially a problem with titanium tubing. Titanium does not like to flow into rectangular grooves. In fact, when swaged into rectangular grooves, the tubing deforms into a trapezoidal shape, leaving areas of highly stressed and unsupported material in shear. The swaged tubing therefore tends to develop cracks and leaks.

Theoretically, ramped grooves can be preferable to rectangular grooves for use in swaged contact with tubing. This is because the ramped groove allows the tubing material to flow smoothly into the grooves resulting in continuous grain flow. This continuous grain flow reduces shear stresses in the tube material. In addition, the ramp causes a more gradual transition from swaged to unswaged material than a rectangular groove, thus reducing the number of stress points and stress risers in the swaged tubing. The theoretical advantages of the ramped groove, such as those in the coupling sleeve of U.S. Pat. No. 4,026,006, are limited by the fact that currently used coupling sleeves are usually swaged only by force from outside the sleeve. External swaging fails to take advantage of the highly desirable compressive stresses which can be exerted on the outside of the tubing when swaging is internal. Therefore, currently used coupling sleeves with ramped grooves tend to induce an unacceptable amount of cracking in tubing to which they are swaged. Currently used couplings with ramped grooves also tend to vibrate loose in aerospace use, causing premature failures.

There exists therefore the need for improved couplings for swaged attachment to thin wall, flareless tubing which have improved metal fatigue characteristics, which do not tend to vibrate loose from the tubing to which they are swaged, and which are internally swaged to the tubing.

SUMMARY

According to the invention, there is provided a coupling for swaged attachment to thin wall tubing. The term "coupling" includes, for instance, both a coupling sleeve and a coupling union.

In one preferred form, the coupling has a cylindrical body with a longitudinal axis, an inner wall and at least one groove located in the inner wall of the sleeve. The groove has a base and sidewalls meeting the base to form corners. At least one of the corners between the base and the side walls is rounded with a radius of curvature of at least about equal to the depth of the groove. The depth of the groove is defined as the distance between the inner wall of the sleeve and the base of the groove.

Further according to the invention, there is also provided an improved coupling for swaged attachment to thin wall tubing comprising a cylindrical body with a longitudinal axis and an inner wall with at least one ramped annual groove located in the inner wall. The cross-section of the groove has a base and two side walls, the first side wall meeting the base at an angle of about 90° and the second side wall meeting the base at an angle substantially greater than 90°.

In another preferred form of the invention, the longitudinal cross section of the groove has a base and two side walls with one side wall meeting the inner wall of the cylindrical body at an angle of about 90° and the second wall meeting the inner wall of the cylindrical body at an angle substantially less than 90°.

The body of the coupling is adapted to remain unchanged when the tube is swaged outwardly into the groove. Preferably, for aerospace use, the coupling is made of titanium or stainless steel, particularly 15-5 PH (precipitation hardened). The coupling is interchangeable with existing couplings.

DESCRIPTION OF THE DRAWINGS

The details of the invention will be further understood by reference to the drawings, wherein:

FIG. 1 is a side elevation view of a first coupling embodiment, shown partly in section wherein a coupling sleeve and a coupling union are swaged to thin wall flareless tubing.

FIG. 2 is an enlarged fragmentary sectional view of a portion of FIG. 1, illustrating in greater detail a coupling union.

FIG. 3 is an enlarged section of a portion of FIG. 1 showing in greater detail the coupling sleeve.

FIG. 4 is an enlarged cross section of a groove of the coupling sleeve of FIG. 1.

FIG. 5 is a side elevation of a second coupling embodiment shown in partial section.

FIG. 6 is an enlargement of a portion of the sectional view of the coupling sleeve of FIG. 5 illustrating in greater detail the grooves in the inner peripheral wall of the sleeve.

DESCRIPTION

Two embodiments of the invention are illustrated herein. FIGS. 1-4 illustrate an embodiment of a coupling with rectangular inner grooves. FIGS. 5 and 6 illustrate a second embodiment of the coupling with ramped grooves and a rectangular groove.

FIG. 1 shows, in half section an embodiment of a coupling installation wherein a coupling union 10 has a longitudinal axis 11, an inner peripheral surface 12 and an externally threaded surface 19.

As shown in detail in FIG. 2 and 3, a tube 4 is rigidly affixed to the coupling union 10 by a swaging operation which is performed prior to the joining of the coupling assembly. There are grooves 14 in the inner peripheral surface 12 of union 10, spaced axially along the longitudinal axis 11. Portions 6 of the tubing wall are deformed in an annular pattern outwardly such that the portions of the tubing wall extend into and substantially fill the annular cavities defined by the grooves 14 of the union 10, and the tubing is in compression. This deformation is preferably accomplished by application of pressure at the tube inner wall which forces the tube material to expand outwardly into the grooves 14 of the union 10. Such internal swaging results in less metal fatigue both to the tubing being swaged and to the coupling sleeve than does external swaging.

As shown in FIGS. 2 and 3, the width 53 of each of the grooves 14 in the inner peripheral surface 12 of union 10 is about equal, and the depth 56 of the grooves is also about equal for all the grooves. The depth and width of grooves 14 is also specified according to the requirements of the present invention, as set out in detail hereinbelow.

As shown in FIG. 4, the grooves 14 comprise in cross-section a base 52 and two side walls 54 which meet the base to form internal corners 58. The grooves 14 have a depth 56 which is the distance between the inner peripheral surface 12 of the union 10 and the base 52 of the grooves 14. They also have a width 53 defined as the maximum distance between the side walls 54.

The depth 56 and width 53 of each groove 14 can vary dependent upon the outer diameter of the tubing to be swaged as shown in Table I.

TABLE I

Example of Suitable Groove Width and Depth
All Dimensions are in Inches

| Tube O.D. | Groove Width | Groove Depth |
| --- | --- | --- |
| ¼ | .060 | .003 |
| 5/16 | .063 | .004 |
| ⅜ | .065 | .0045 |
| ½ | .073 | .005 |
| ⅝ | .081 | .005 |
| ¾ | .070 | .0055 |
| 1" | .070 | .0055 |
| 1¼ | .070 | .006 |
| 1½ | .070 | .0065 |

The corners 58 are each rounded so that the radius of curvature of each corner 58 is about equal to the depth of the groove to insure high tensile strength of the tube in swaged connection to the coupling union 10. Alternatively, the radius of curvature of corners 58 is greater than the depth of the groove.

The side walls 54 meet the internal peripheral surface 12 of union 10 to form edges 59. The edges 59 are sharp, smooth and free of nicks and burrs.

Located intermediate the grooves 14 are annular lands 15. The annular lands have the same diametrical dimension as the inner diametrical measurement of the sleeve. A lip 16 is located on the exterior side of the last groove 14 and defines the tube end of the union. The lip 16 has the same diameter as lands 15.

The right circular cylinder angularity of the surfaces defining the lands 15 and grooves 14 provides the means whereby the lands, particularly, engage the walls of the tubing in the regions of deflection to provide sound, reliable, and pressure tight seals upon application of proper swaging forces from inside the tubing.

The tube 4 is coupled to a tube 8 by the coupling union 10, a sleeve member 13, and a nut member 40, with an internally threaded surface 44.

The tube 8 is rigidly affixed to the sleeve member 13 by a swaging operation which is performed prior to the joining of the coupling assembly. Sleeve member 13 has an inner peripheral surface 30. The tube 8 is swaged at points 36 into grooves 38 in the inner peripheral surface of the sleeve member 13.

The nut 40 with the internally threaded surface 44 is torqued onto the externally threaded surface 19 of the outer peripheral surface of union 10.

The nut 40 is interfaced with the sleeve member 13 at 27. Upon torquing the nut onto the union 10, a force is exerted to hold the union 10 in contact with sleeve member 13 whereby an inwardly tapered edge outer peripheral surface 18 on sleeve member 13 contacts an outwardly tapered inner peripheral surface 17 on union 10, forming metal to metal between mating union 10 and sleeve member 13.

On the exterior peripheral surface of the union 10 there is a raised central section 20 located intermediate portions 22 and 24. End portions 22 and 24 are each of a diameter less than the diameter of central section 20 and are integrally formed therewith to define at the respective points of juncture a first and second shoulder 26 and 28 facing in opposite directions from central section 20. The raised central section 20 gives the union added thickness at the point of the grooves whereby the sleeve is not deformed when tubing is swaged outwardly into the grooves, and additionally provides an hexagonal region 121 for receiving a wrench or other suitable tool. In FIG. 3, the central portion 122 serves as a similar reinforcement against deformation.

FIG. 5 illustrates a coupling sleeve 70 according to a second embodiment of the present invention, partially in section. The sleeve 70 comprises a longitudinal axis 71, and an inner peripheral surface 74 with ramped annular grooves 78 and a rectangular groove 80 spaced axially along the longitudinal axis 71.

FIG. 6 illustrates the ramped grooves 78 and rectangular groove 80 of sleeve 70 swaged to a section of thin wall tubing 94. Sections 81 of the tubing are outwardly swaged to flow into ramped grooves 78 and rectangular groove 80 of sleeve 70.

As shown in FIG. 5 and illustrated in more detail in FIG. 6, each groove 78 comprises a base 82, and two side walls. One side wall 86 of each ramped groove 78 meets the base 82 at about 90° to form corners 88. The radius of curvature of corners 88 is no greater than about 0.005 inches. A second side wall 90 meets the base at an angle of about 135° to form corners 92. The radius of curvature of corners 92 is about 0.035 inches.

Side walls 86 of the ramped grooves 78 meet the inner peripheral surface 74 of the sleeve at 90° at edges 87. Edges 87 are sharp and free from burrs. The sharp edges 87 maintain leak tight integrity of the joint of the coupling sleeve swaged to the tubing.

Side walls 90 of the grooves 78 meet the inner peripheral surface 74 of the sleeve at an angle of less than about 15°, the angle being defined between theoretical extensions to the surfaces 74 and 90. The second side wall thus meets the base at a complementary angle of greater than about 165°. The overall length of the groove and depth of the groove dictates the ramp angle which is preferably less than the said 15°. In the embodiment illustrated with the four ramped grooves the angle is about 9°. This angle ensures that the ramp surface places a compression load or force on the swaged tubing.

As shown in FIG. 6, an end groove 80, namely a relief groove, is rectangular in shape with two side walls 89 meeting the base 82 at about 90° to form corners 93. The radius of curvature of corners 93 is about 0.005 inches. When the tubing 94 is swaged outwardly into the grooves 78 and groove 80, a permanent seal is formed which does not tend to loosen when exposed to vibration. The internally swaged tubing fills or partially fills grooves 78, possibly leaving a small space 75. As a result of the swaging of the tubing into the ramped grooves 78 material from the tubing end flows into rectangular groove 80 so that no burrs are left on the swaged tubing. Sidewall 89 extends into the fitting to a diameter less than the diameter at 74 and in fact less than the applicable outside diameter 94. Side wall 89 is therefore referred to as a stop, which limits tube insertion into the fitting to a required depth.

The base 82 of each groove is about 0.030 inches long. The depth 72 of the ramped grooves varies from 0.005 inches at the tapered end of the sleeve 70 to a maximum of 0.009 inches at the non-tapered end. The gradation in groove depth provides a smooth transition from swaged to unswaged tubing so that a minimum stress and disruption of grain flow is exerted on the tubing 94 swaged into the grooves 78 and 80. The sleeve 70 illustrated in FIGS. 5 and 6 is suitable for size 4 through 12 tubing. For use with larger tubing, the groove depth can vary from 0.005 at the nontapered end to 0.014 at the blunt end. The outer peripheral surface 76 is tapered so that the coupling sleeve 70 is interchangeable with existing coupling sleeves.

The outer peripheral surface 76 of sleeve 70 has a shoulder 84. The outward peripheral surface 76 also has a raised section 85 contiguous with shoulder 84. The shoulder 84 fits a retaining wire 110 located in the inner peripheral surface of a nut 120, and the raised section 85 abuts the retaining wire 110 and holds the sleeve in place. The nut 120 has an internally threaded surface 130. A coupling 160 has an externally threaded surface 140. The nut 120 is torqued onto the coupling 160 to force sealing lip 112 of the coupling sleeve 70 against the sealing surface 113 of the male coupling 160. Internally directed lip 114 effectively locates the retaining wire 110 in position thereby sealing the swaged sleeve 70 to the male coupling 160.

The coupling sleeve is preferably made of titanium or steel alloy for aerospace use up to 8000 psi. Aluminum can be used if the coupling sleeve is used in commercial applications at much lower pressures.

From the foregoing description it is seen that the present invention provides an improved coupling sleeve with at least one rectangular groove for swaged attachment to thin wall tubing. The invention also provides an improved coupling sleeve with at least one ramped groove which is internally swaged to thin wall tubing. As described if made of titanium or steel alloy the invention is suitable for aerospace use. The invention could, for example, be made of a lighter material such as aluminum for commercial, non-aerospace use. It is therefore clear that the invention may have uses which are not specifically pointed out. There may be more or less rectangular grooves than in the specific embodiments described. The invention may also have more or less ramped grooves than the specific embodiment described. The spirit and scope of the appended claims should not be limited to the description of the exemplary versions contained herein.

We claim:

1. A coupling for operation at pressures in the range of several thousand p.s.i., for swaged attachment to thin wall titanium alloy tubing, the coupling comprising:
   (a) a hollow cylindrical body having an inner wall and longitudinal axis through the body;
   (b) only three annular substantially right circular grooves located in the inner wall, the grooves having a cross-section being formed by base and side walls meeting the base to form corners; both of the corners between the base and the side walls being rounded with a radius of curvature at least about equal to the depth of the groove, the grooves being spaced from each other along the longitudinal axis, and all grooves having this cross-section; and
   (c) right circular lands located in the inner wall of the body separating the annual grooves.

2. The coupling of claim 1 wherein the corners of the grooves are both rounded to a radius greater than the depth of the groove.

3. The coupling of claim 1 wherein the corners of the groove are both rounded to a radius equal to the depth of the groove.

4. A coupling of claim 1 wherein with thin walled tubing of about ¼ inch diameter the depth of the groove is about 0.003 inches, and the radius of curvature of the corners is about 0.007 inches.

5. The coupling of claim 1 wherein with thin walled tubing of an outer diameter of about 1½ inches the depth of the groove is about 0.0065 inches, and the radius of curvature of the corners is about 0.007 inches.

6. The coupling of claim 1 wherein with thin walled tubing of an outer diameter between ¼ inch and 1½ inches the groove has a depth of from about 0.003 inches to about 0.0065 inches and the radius of curvature of the corners is about 0.007 inches.

7. The coupling of claim 1 wherein with tubing with an outer diameter of about ¼ inch the groove has width of about 0.060 inches and the radius of curvature of the corners is about 0.007 inches.

8. The coupling of claim 1 wherein with thin wall tubing with an outer diameter of about 1½ inches the groove has a width of about 0.070 inches and the radius of curvature of the corners is about 0.007 inches.

9. The coupling of claim 1 wherein with tubing with an outer diameter of from about ¼ inch to about 1½ inches the groove width is from about 0.060 inch to about 0.070 inch and the radius of curvature of the corners is about 0.007 inches.

10. A coupling for swaged attachment to thin wall titanium alloy tubing, the coupling comprising:
   (a) a hollow cylindrical body having an inner wall and a longitudinal axis through the body; and
   (b) a plurality of non-right circular grooves located in the inner wall and spaced axially along the longitudinal axis, the cross section of the plurality of non-right circular grooves having a base and two side walls, a first side wall meeting the base at an angle of about 90° and a second side wall meeting the base at an angle of between about 135° and about 165°;

The body being adapted to remain substantially unchanged when the tube is swaged outwardly into the grooves.

11. The coupling of claim 10 further comprising right circular lands located in the inner wall of the body separating the annular grooves.

12. The coupling of claim 10 in which the base of the groove is 0.030 inches long and the depth of the groove is between 0.005 inches deep and 0.009 inches deep.

13. The coupling of anyone of claim 10, 1 or 11 further comprising at least one annular substantially right circular groove located in the inner wall, the right circular groove having a base and side walls meeting the base at about 90° to form corners.

14. The coupling of either claim 10 or 11 wherein for each groove the first side wall is located forwardly of the second side wall and relatively closer to a leading free end of the cylindrical body.

15. The coupling of claim 13 wherein for each groove which in non-right circular the first side wall is located forwardly of the second side wall and relatively closer to a leading free end of the cylindrical body.

16. The coupling of claim 15 wherein there are at least three non-right circular grooves.

17. A coupling for swaged attachment to thin wall titanium alloy tubing, the coupling comprising:
 (a) a hollow cylindrical body having an inner wall and a longitudinal axis through the body; and
 (b) a plurality of non-right circular grooves located in the inner wall, the longitudinal cross section of the grooves having a base and two side walls with a first side wall meeting the inner wall of the cylindrical body at an angle of about 90° and the second side wall meeting the inner wall of the cylindrical body an angle of about 15°;

the body being adapted to remain unchanged when the tube is swaged outwardly into the groove.

18. The coupling of claim 17 wherein the second side wall meets the inner peripheral wall of the coupling at less than 15°.

19. The coupling of claim 17 further comprising right circular lands located in the inner wall of the body separating the annular grooves.

20. The coupling of claim 17 in which the base of the groove is 0.030 inches long and the depth of the groove is between 0.005 inches deep and 0.014 inches deep.

21. The coupling of anyone of claim 17, 18 or 19 further comprising at least one annular substantially right circular groove located in the inner wall, the right circular groove having a base and side walls meeting the base at about 90° to form corners.

22. The coupling of either claim 17 or 19 wherein for each groove the first side wall is located forwardly of the second side wall and relatively closer to a leading free end of the cylindrical body.

* * * * *